J. HENRICHSEN & C. J. HEMMINGSEN.
MILKING APPLIANCE.
APPLICATION FILED MAY 24, 1910.
988,708.
Patented Apr. 4, 1911.
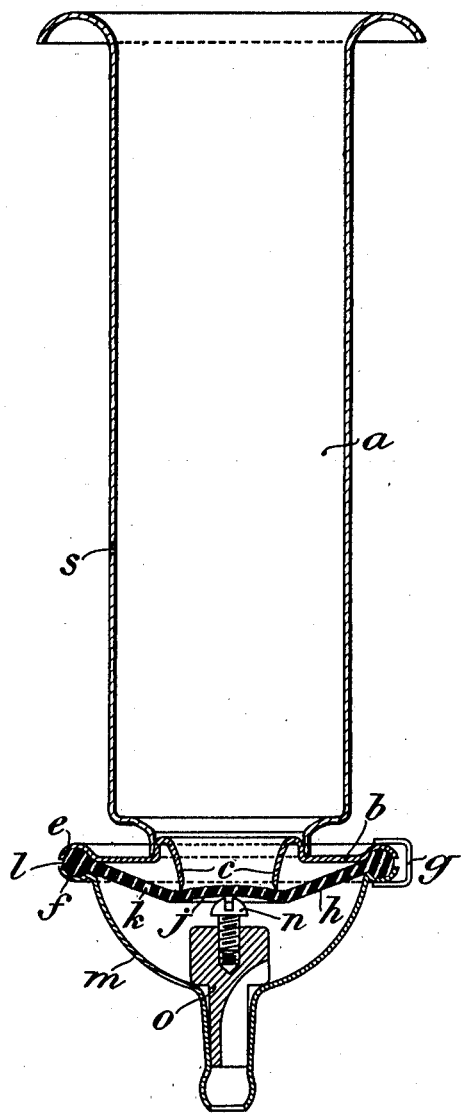
Witnesses:
John Murtagh
L. J. Murphy
Inventors:
Jacob Henrichsen and
Carl Johannes Hemmingsen

UNITED STATES PATENT OFFICE.

JACOB HENRICHSEN AND CARL JOHANNES HEMMINGSEN, OF COPENHAGEN, DENMARK.

MILKING APPLIANCE.

988,708.  Specification of Letters Patent.  Patented Apr. 4, 1911.

Application filed May 24, 1910. Serial No. 563,093.

*To all whom it may concern:*

Be it known that we, JACOB HENRICHSEN, of 21 Loengangsstraede, merchant, and CARL JOHANNES HEMMINGSEN, of 13 Kingosgade, machine manufacturer, Copenhagen, Denmark, have invented new and useful Improvements in Milking Appliances, of which the following is a specification.

This invention refers to milking appliances of the kind in which milking is effected by suction and in the manner described in Patent No. 938,857, in which the connection between the suction pipe and the sucking cup is effected through an aperture in or at the side of an elastic closing member which in its normal position closes the outlet of the sucking cup and which in this case owing to the transmission of the suction through the said aperture, is exposed on both sides to the same diminished air pressure. In the sucking cup here described the size of the outlet, the tension of the closing member and the size of the said aperture are fixed in such a way in relation to each other that the closing member normally, *i. e.* when a suitable diminution of air pressure is produced in the suction pipe and when the atmospheric pressure acts freely in the sucking cup, is unable to close this one, the tension of the closing member in closing position not being sufficient to withstand the sucking action upon that part of the said member, that corresponds to the enlarged outlet. When the cup already in sucking action *i. e.* without the use of a special starting appliance, is applied to the teat and the milk begins to flow, the aperture will pneumatically be closed by the passing milk, and the closing member will be held automatically more or less stretched or more or less removed from the outlet. When the milking ceases either intermittently or completely, so that the said aperture is pneumatically released, the closing member will assume the closing position, the pressure inside the sucking cup fixed on the teat being then lower than that of the atmosphere. When the pressure inside the sucking cup increases, either owing to still outflowing milk or to air finding its way through openings at the root of the teat, or through an intentionally arranged small air hole in the wall of the sucking cup, the closing member will again leave the closing position, the milk present will be sucked away, and the inside pressure in the sucking cup will again be reduced.

A constructional form in longitudinal section of the invention is shown on the drawing.

$a$ is the suction cup with the air hole $s$. To the lower end of the sucking cup is fixed, either by screwing, soldering or in some other way a flange piece $b$ which at the rim is shaped as a groove $e$.

$m$ is the joint connection piece for the suction pipe. This is also at the rim shaped as a groove $f$ corresponding to the groove $e$, and between these two grooves is inserted the rim of a diaphragm $h$ constituting the closing member. The joining together of the pieces $b$ and $m$ is effected by means of suitable clutches $g$ bayonet joint connection or the like.

$c$ is the enlarged sucking cup outlet, $j$ the part of the diaphragm corresponding to the said outlet, and $k$ the aperture in the diaphragm. The tension of the diaphragm can be regulated by means of a set screw $n$ in a piece $o$ fixed to the joint connection piece $m$.

The following is an example of the working of the apparatus. A certain vacuum corresponding to for instance 40 cm. mercury, is kept in the working pipe and the milk pail. When the sucking cups are to be applied to the udder of the cow the atmospheric pressure corresponding to about 76 cm. mercury has acted upon the diaphragm and pressed this one downward in a curved position. The sucking cups will therefore at once adhere to the udder and the pressure inside the cups will decrease until the tension of the diaphragm prevents further sucking, for instance at a pressure corresponding to say 34 cm. mercury. The vacuum in the cups will now rapidly decrease, and when gone down for instance to a pressure of above 13 cm. mercury which can be regulated by means of a set screw $n$ the diaphragm will re-open and the suction through the small aperture $k$ will be transmitted to the interior of the sucking cups. This pulsation will be repeated for instance 30 to 50 times a minute and keep on as long as the milk does not flow rapidly. When the milk is running freely, the diaphragm will adjust itself in a more or less curved position downward, all according to whether the teat is hard to milk or easy to milk, and the greater part of the milk will be sucked away at a very low vacuum. When the strong flow of milk ceases the pulsation will recommence and cause a kind of after-milking.

What we claim as our invention, and desire to secure by Letters Patent is:—

1. In an appliance for milking by suction, the combination of a suction cup having an enlarged outlet opening at the bottom, a diaphragm box communicating with said cup and the suction tube, and an elastic diaphragm disposed across said box and adapted to close said enlarged opening and having a small opening out of register with the enlarged opening, the pressure of the tension of the diaphragm tending to keep the enlarged opening closed being less than the opposing pressure resulting from the normal operating pressure in the vacuum tube and the normal atmospheric pressure on the diaphragm at the enlarged opening when the enlarged opening is closed by the diaphragm, said tension being strong enough to cause the diaphragm to close the enlarged opening when the pressure on both sides of the diaphragm is approximately equal.

2. In an appliance for milking by suction, the combination of a suction cup having at the bottom an enlarged outlet, a diaphragm box below the cup and communicating at its upper part with the suction cup through said outlet and communicating at its lower part with the vacuum tube, and an elastic diaphragm arranged across said box and adapted to close said outlet when the pressures on both sides are approximately equal and adapted to be moved away from said outlet by normal atmospheric pressure when the pressure in the vacuum tube is at the normal operating pressure.

3. In an appliance for milking by suction, the combination of a suction cup having an enlarged opening at the bottom, a diaphragm box communicating with said opening and the suction tube, a diaphragm arranged across said box, and adapted to close said opening when the pressures on both sides are approximately equal and adapted to be moved away from said opening by normal atmospheric pressure when the pressure in the suction tube is at the normal operating pressure, and adjustable means bearing against the diaphragm for regulating the tension thereof.

4. In an appliance for milking by suction, the combination of a suction cup having a lateral air-hole, a flange piece secured to the lower end of the suction cup and having a central outlet opening and having a grooved rim, a joint connection piece connecting with the suction pipe and also having a grooved rim, a diaphragm having an orifice eccentric thereto and having its edge secured between said grooves, and clutches holding said pieces together.

5. In an appliance for milking by suction, the combination of a suction cup having a lateral air-hole, a flange piece secured to the lower end of the suction cup and having a central outlet opening and having a grooved rim, a joint connection piece connecting with the suction pipe and also having a grooved rim, a diaphragm having an orifice eccentric thereto and having its edge secured between said grooves, clutches holding said pieces together, a supporting piece fixed to the joint connection, and a set-screw screwed into said supporting piece and bearing against the diaphragm.

In testimony, that we claim the foregoing as our invention, we have signed our names in presence of two subscribing witnesses.

JACOB HENRICHSEN.
CARL JOHANNES HEMMINGSEN.

Witnesses:
ERNEST BOUTARD,
P. HOFMAN BANG.